(12) United States Patent
Kim

(10) Patent No.: US 12,704,738 B2
(45) Date of Patent: Aug. 11, 2026

(54) OPTICAL SYSTEM FOR HOLOGRAM DISPLAY

(71) Applicant: ELECTRONICS AND TELECOMMUNICATIONS RESEARCH INSTITUTE, Daejeon (KR)

(72) Inventor: Hyun Eui Kim, Cheongju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 293 days.

(21) Appl. No.: 18/537,418

(22) Filed: Dec. 12, 2023

(65) Prior Publication Data

US 2024/0192515 A1 Jun. 13, 2024

(30) Foreign Application Priority Data

Dec. 13, 2022 (KR) ........................ 10-2022-0173479
Dec. 12, 2023 (KR) ........................ 10-2023-0179241

(51) Int. Cl.
*G02B 27/28* (2006.01)

(52) U.S. Cl.
CPC .................................. *G02B 27/283* (2013.01)

(58) Field of Classification Search
CPC .... G02B 27/28; G02B 27/283; G02B 27/286; G02B 27/102; G02B 27/145; G02B 27/1026; G02B 27/10; G02B 27/144; G02B 27/143; G02B 27/123; G02B 27/149; G02B 5/30; G02B 5/305; G02B 5/3058; G02B 5/3083; H04N 9/3111; H04N 9/3117; H04N 9/3164; H04N 9/3167
USPC ............ 359/489.07, 489.08, 485.04, 487.04, 359/485.01, 485.03, 487.01, 247, 250, 359/256; 353/20, 30, 33, 81
See application file for complete search history.

(56) References Cited

U.S. PATENT DOCUMENTS 3,940,203 A 2/1976 La Russa
5,530,586 A 6/1996 Yasugaki
2009/0174920 A1 * 7/2009 Jeong ................. G11B 7/24038 359/31

(Continued)

FOREIGN PATENT DOCUMENTS

JP H6-59217 A 3/1994
JP H7-159719 A 6/1995

(Continued)

*Primary Examiner* — Jie Lei

(57) ABSTRACT

An optical system for hologram displays is disclosed. According to an embodiment of a present disclosure, the optical system comprising a polarizing beam splitter for reflecting a light wave when the light wave is horizontally polarized or transmitting a light wave when the light wave is vertically polarized, a second quarter wave plate, a half mirror, and a first quarter wave plate, sequentially arranged in a first direction from the polarizing beam splitter, a third quarter wave plate and a first mirror, sequentially arranged in a second direction from the polarizing beam splitter, a fourth quarter wave plate and a second mirror, sequentially arranged in a third direction from the polarizing beam splitter, which is a direction opposite to the second direction and a reflective polarizer arranged in a fourth direction from the polarizing beam splitter.

12 Claims, 7 Drawing Sheets

(56) References Cited

U.S. PATENT DOCUMENTS

| | | | | |
|---|---|---|---|---|
| 2011/0007392 | A1* | 1/2011 | English, Jr. .......... | G02B 27/145<br>359/489.08 |
| 2012/0008096 | A1 | 1/2012 | Magarill et al. | |
| 2020/0387003 | A1 | 12/2020 | Yun et al. | |
| 2021/0286124 | A1 | 9/2021 | Peng et al. | |

FOREIGN PATENT DOCUMENTS

| | | | |
|---|---|---|---|
| KR | 10-2011-0015011 | A | 2/2011 |
| KR | 10-2020-0100066 | A | 8/2020 |
| KR | 10-2022-0147088 | A | 11/2022 |

* cited by examiner

OPTICAL SYSTEM FOR HOLOGRAM DISPLAY

CROSS-REFERENCE TO RELATED APPLICATIONS

The present application is based on, and claims priority from, Korean Patent Application Number 10-2022-0173479, filed Dec. 13, 2022, and Korean Patent Application Number 10-2023-0179241, filed Dec. 12, 2023, the disclosure of which is incorporated by reference herein in its entirety.

TECHNICAL FIELD

The present disclosure relates to an optical system for hologram displays. More particularly, the present disclosure relates to an optical system that forms a long optical path and has a miniaturized form factor.

BACKGROUND

The statements in this section merely provide background information related to the present disclosure and do not necessarily constitute prior art.

Holography technology is a technology for recording or reproducing information about the amplitude and the phase of light using the interference phenomenon of light. A hologram is a three-dimensional image captured based on such holography technology.

Recently, thanks to the development of technology for displaying 3D images, 3D images have been used in various industrial fields. In particular, research on technology for holograms that reproduce life-like objects has been actively conducted, and contents have been produced using holograms in various fields such as broadcasting, exhibitions, and performances.

An optical system performs optical functions. Here, the optical functions include expansion of the display area, the Fourier transform, noise removal, etc. In order to perform such optical functions, an optical system needs to form a long optical path. However, an optical system capable of forming a long optical path has a large form factor, so it is difficult to use it as a commercial display product. This is because commercial display products such as wearable or portable display devices have a miniaturized structure. Accordingly, there is a need to manufacture a miniaturized optical system capable of forming a long optical path.

SUMMARY

Technical Problem

The present disclosure is aimed at providing an optical system where a quarter wave plate, a half mirror, and another quarter wave plate are sequentially arranged in a first direction from a polarizing beam splitter, a quarter wave plate and a mirror are sequentially arranged in each of second and third directions perpendicular to the first direction, and a reflective polarizer is arranged in a fourth direction opposite to the first direction.

In addition, according to an embodiment of the present disclosure, it may be possible to apply the structure of a miniaturized optical system to a display device and a system for reconstructing a hologram.

The problems to be solved by the present disclosure are not limited to those mentioned above, and the description below would allow a person having ordinary skill in the art to clearly understood other problems not mentioned above.

Technical Solution

According to the present disclosure, an optical system comprising a polarizing beam splitter for reflecting a light wave when the light wave is horizontally polarized or transmitting a light wave when the light wave is vertically polarized, a second quarter wave plate, a half mirror, and a first quarter wave plate, sequentially arranged in a first direction from the polarizing beam splitter, a third quarter wave plate and a first mirror, sequentially arranged in a second direction from the polarizing beam splitter, a fourth quarter wave plate and a second mirror, sequentially arranged in a third direction from the polarizing beam splitter, which is a direction opposite to the second direction and a reflective polarizer arranged in a fourth direction from the polarizing beam splitter, the first direction is a direction opposite to a direction in which the light wave is input, the second direction is a direction in which the first direction is rotated 90 degrees counterclockwise, the third direction is a direction opposite to the second direction, the fourth direction is a direction opposite to the first direction.

Advantageous Effects

According to the present disclosure, it may be possible for an optical system to form a long optical path compared to its size by having a structure in which a quarter wave plate, a half mirror, and another quarter wave plate are sequentially arranged in a first direction from a polarizing beam splitter, a quarter wave plate and a mirror are sequentially arranged in each of second and third directions perpendicular to the first direction, and a reflective polarizer is arranged in a fourth direction opposite to the first direction.

Furthermore, according to an embodiment of the present disclosure, it may be possible to miniature a hologram display system and a system for reconstructing a hologram by applying the structure of a miniaturized optical system to the hologram display system and the system for reconstructing a hologram.

The effects of the present disclosure are not limited to those mentioned above, and the description below would allow a person having ordinary skill in the technical field to which the present disclosure pertains to clearly understood other effects not mentioned above.

DETAILED DESCRIPTION

Figure 1A:
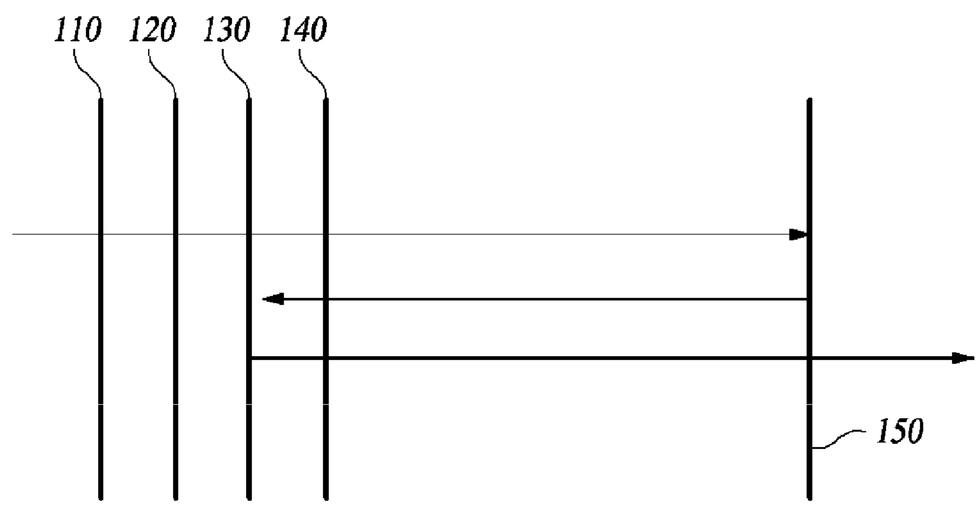
FIGS. 1A and 1B are views for illustrating the structure and an optical path of an optical system according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure, and is not intended to represent the only embodiments in which the present disclosure may be practiced.

Figure 1B:
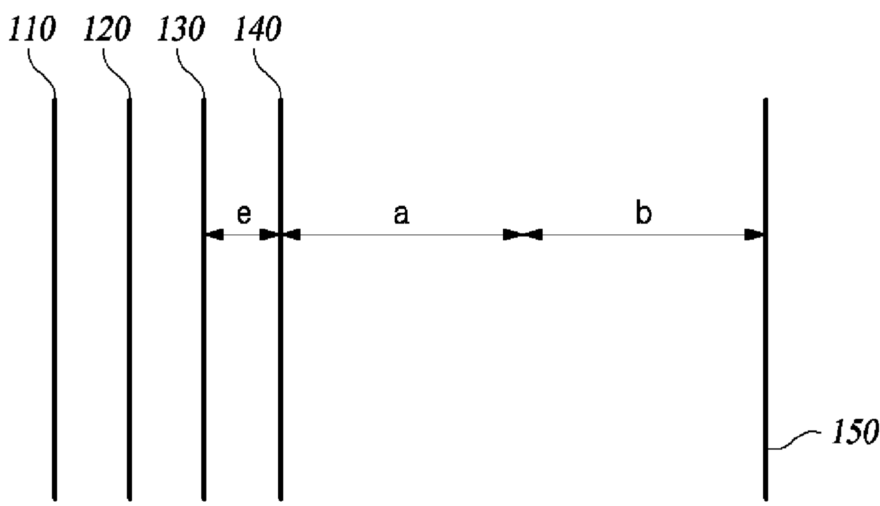

FIGS. 1A and 1B are views for illustrating the structure and an optical path of an optical system according to an embodiment of the present disclosure.

Referring to FIG. 1A, the structure of the optical system 10 may include a polarizer 110, a first quarter wave plate 120, a half mirror 130, and a second quarter wave plate 140, a reflective polarizer 150, etc. The structure of the optical system 10 may be a folding optical structure. The folding optical structure may be a structure where light waves are repeatedly reflected in an optical system to lengthen an optical path compared to a physical distance. The structure of the optical system 10 may be a structure where light waves are reflected using a polarizing element that selectively reflects light waves based on the state of polarization. The polarization means that when an electromagnetic wave travels, the electric or magnetic fields that make up the wave oscillate in a specific direction.

In the structure of the optical system 10, the polarizer 110, the first quarter wave plate 120, the half mirror 130, and the second quarter wave plate 140 may be sequentially arranged in a predetermined direction, and the reflective polarizer 150 may be arranged to be spaced apart from the second quarter wave plate 140 in a predetermined direction. Here, the predetermined direction may refer to the direction in which a light wave is incident on the polarizer 110.

When a light wave passes through the polarizer 110, the polarizer 110 may pass only horizontally polarized light, which is the initial polarization of the light wave. The polarizer 110 may be a thin film that allows light waves to pass in only one direction. When a light wave passes through the polarizer 110 and then the first quarter wave plate 120, the first quarter wave plate 120 may convert the horizontal polarization of the light wave into Right-handed Circular Polarization (RCP). A quarter wave plate is an optical element that converts the polarization of light waves. A light wave may pass through the first quarter wave plate 120 and then through the half mirror 130 and the second quarter wave plate 140. When the light wave passes through the half mirror 130 and the second quarter wave plate 140, the second quarter wave plate 140 may convert the polarization of the light wave from the RCP to horizontal polarization. The light wave may pass through the second quarter wave plate 140 and may then be incident on the reflective polarizer 150. The light wave may be reflected by the reflective polarizer 150, which selectively reflects horizontally polarized light, and may then be incident on the second quarter wave plate 140. When the light wave passes through the second quarter wave plate 140, the second quarter wave plate 140 may convert the horizontal polarization of the light wave to the RCP.

After passing through the second quarter wave plate 140, the light wave may be incident on the half mirror 130. When the light wave is reflected by the half mirror 130, the half mirror 130 may convert the polarization of the light wave from the RCP to Left-handed Circular Polarization (LCP). After being reflected by the half mirror 130, the light wave may be incident on the second quarter wave plate 140. When the light wave passes through the second quarter wave plate 140, the second quarter wave plate 140 may convert the polarization of the light wave from the LCP to vertical polarization. After passing through the second quarter wave plate 140, the light wave may be incident on the reflective polarizer 150. Because the reflective polarizer 150 may transmit vertically polarized light, the light wave may pass through the reflective polarizer 150 to be output.

Referring to FIG. 1B, the light wave incident on the structure of the optical system 10 may be output after traveling the physical distance between the half mirror 130 and the reflective polarizer 150 three times. "e" may denote the distance between the half mirror 130 and the second quarter wave plate 140, "a" may denote the distance between the second quarter wave plate 140 and any point between the second quarter wave plate 140 and the reflective polarizer 150, and "b" may denote the distance between the reflective polarizer 150 and any point between the second quarter wave plate 140 and the reflective polarizer 150.

A light wave incident on the structure of the optical system 10 may pass through the half mirror 130 and the second quarter wave plate 140, and may then be reflected by the reflective polarizer 150. Afterwards, the light wave may pass back through the second quarter wave plate 140 and may then be reflected by the half mirror 130. Finally, after passing through the second quarter wave plate 140 and then the reflective polarizer 150, the light wave may be output. Accordingly, the optical path may be a path where light waves are output after traveling the physical distance e+a+b three times. That is, in the structure of the optical system 10, two reflections may occur in the section between the half mirror 130 and the reflective polarizer 150, so an optical path of three times the physical distance e+a+b (3(e+a+b)) may be formed.

Figure 2A:
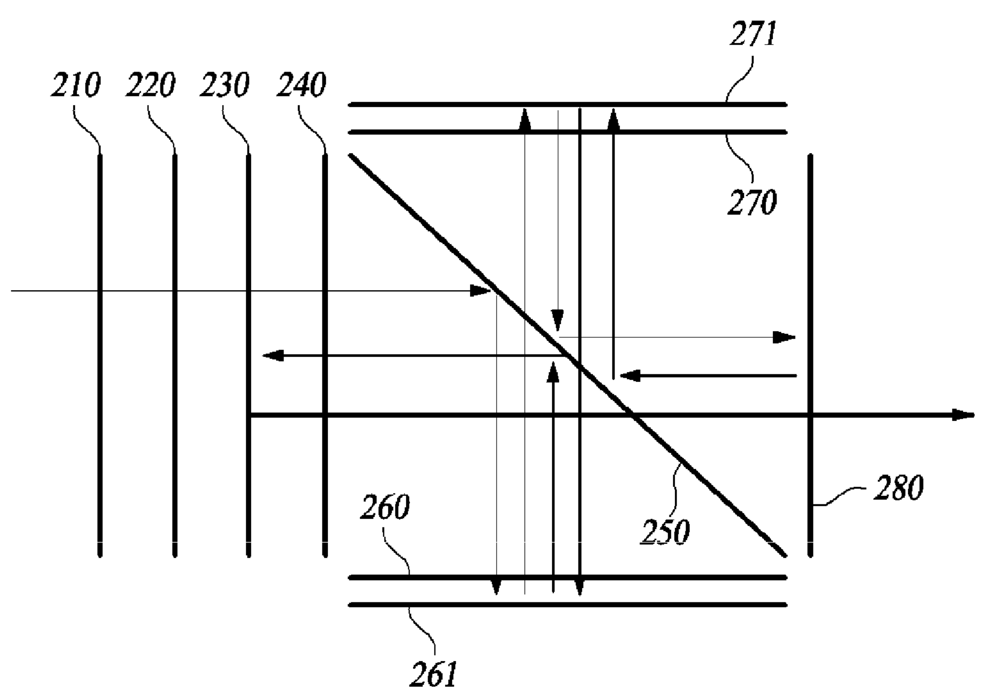
FIGS. 2A and 2B are views for illustrating the structure and an optical path of the optical system according to another embodiment of the present disclosure.
Figure 2B:
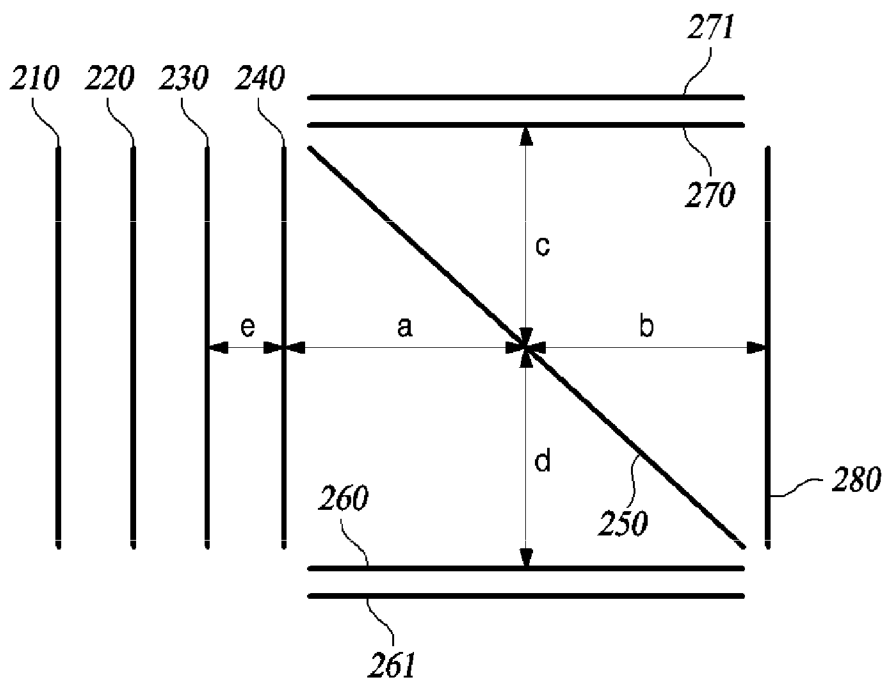

FIGS. 2A and 2B are views for illustrating the structure and an optical path of an optical system according to another embodiment of the present disclosure.

Referring to FIG. 2A, the structure of the optical system 20 may include a polarizer 210, a first quarter wave plate 220, a half mirror 230, a second quarter wave plate 240, a polarizing beam splitter 250, a third quarter wave plate 260, a first mirror 261, a fourth quarter wave plate 270, a second mirror 271, a reflective polarizer 280, etc. The structure of the optical system 20 may be a folding optical structure. In the structure of the optical system 20, light waves may be reflected by a polarizing element that selectively reflects light waves based on the state of polarization.

The second quarter wave plate 240, the half mirror 230, the first quarter wave plate 220, and the polarizer 210 may be sequentially placed in a first direction from the polarizing beam splitter 250 of the structure of the optical system 20, and the third quarter wave plate 260 and the first mirror 261 may be sequentially arranged in a second direction from the polarizing beam splitter 250 thereof. Here, the first direction may be opposite to the direction in which a light wave is input, and the second direction may be a direction in which the first direction is rotated counterclockwise by 90 degrees. The fourth quarter wave plate 270 and the second mirror 271 may be sequentially arranged in a third direction from the polarizing beam splitter 250 of the structure of the optical system 20, and the reflective polarizer 280 may be placed in a fourth direction from the polarizing beam splitter 250 thereof. Here, the third direction may be opposite to the second direction, and the fourth direction may be opposite to the first direction. The polarizing beam splitter 250 may be arranged between the second quarter wave plate 240, the third quarter wave plate 260, the fourth quarter wave plate 270, and the reflective polarizer 280.

However, the structure of the optical system 20 according to the present disclosure is not limited to such an embodiment, and, based on the polarization of an input light wave, all optical elements included in the structure of the optical system 20 may be rotated by a predetermined angle.

When a light wave passes through the polarizer 210, the polarizer 210 may selectively pass horizontally polarized light, which is the initial polarization of the light wave. The polarizer 210 may be a thin film that allows light waves to pass in only one direction. When a light wave passes through the polarizer 210 and then the first quarter wave plate 220, the first quarter wave plate 220 may convert the horizontal polarization of the light wave into the RCP. A quarter wave plate refers to an optical element that converts the polarization of light waves. The light wave may pass through the polarizer 210 and the first quarter wave plate 220, and may then pass through the half mirror 230 and the second quarter wave plate 240. When the light wave passes through the half mirror 230 and the second quarter wave plate 240, the second quarter wave plate 240 may convert the polarization of the light wave from the RCP to horizontal polarization. After passing through the second quarter wave plate 240, the light wave may be incident on the polarizing beam splitter 250.

The polarizing beam splitter 250 may reflect horizontally polarized light and transmit vertically polarized light. Since the polarizing beam splitter 250 may reflect horizontally polarized light, the light wave may be rotated clockwise by 90 degrees and may then be incident on the third quarter wave plate 260. When the light wave passes through the third quarter wave plate 260, the third quarter wave plate 260 may convert the horizontal polarization of the light wave into the RCP. After passing through the third quarter wave plate 260, the light wave may be incident on the first mirror 261. When the light wave is reflected by the first mirror 261, the first mirror 261 may convert the polarization of the light wave from the RCP to the LCP. After being reflected by the first mirror 261, the light wave may be incident on the third quarter wave plate 260. When the light wave passes through the third quarter wave plate 260, the third quarter wave plate 260 may convert the polarization of the light wave from the LCP to vertical polarization.

After passing through the third quarter wave plate 260, the light wave may be incident on the polarizing beam splitter 250. Since the polarizing beam splitter 250 may transmit vertically polarized light, the light wave may pass through the polarizing beam splitter 250 and may then incident on the fourth quarter wave plate 270. When the light wave passes through the fourth quarter wave plate 270, the fourth quarter wave plate 270 may convert the vertical polarization of the light wave into the RCP. After passing through the fourth quarter wave plate 270, the light wave may be incident on the second mirror 271.

When the light wave is reflected by the second mirror 271, the second mirror 271 may convert the polarization of the light wave from the RCP to the LCP. The light wave may be reflected by the second mirror 271 and may then be incident on the fourth quarter wave plate 270. When the light wave passes through the fourth quarter wave plate 270, the fourth quarter wave plate 270 may convert the polarization of the light wave from the LCP to horizontal polarization. The light wave may pass through the fourth quarter wave plate 270 and may then be incident on the polarizing beam splitter 250.

Since the polarizing beam splitter 250 may reflect horizontally polarized light, the light wave may be rotated 90 degrees counterclockwise and may then be incident on the reflective polarizer 280. Since the reflective polarizer 280 may reflect horizontally polarized light and transmit vertically polarized light, the light wave with horizontal polarization may be reflected by the reflective polarizer 280 and may then be incident on the polarizing beam splitter 250. Since the polarizing beam splitter 250 may reflect horizontally polarized light, the light wave may be rotated 90 degrees clockwise and may then be incident on the fourth quarter wave plate 270. When the light wave passes through the fourth quarter wave plate 270, the fourth quarter wave plate 270 may convert the horizontal polarization of the light wave into the LCP. The light wave may pass through the fourth quarter wave plate 270 and may then be incident on the second mirror 271. When the light wave is reflected by the second mirror 271, the second mirror 271 may convert the polarization of the light wave from the LCP to the RCP. The light wave may be reflected by the second mirror 271 and may then be incident on the fourth quarter wave plate 270. When the light wave passes through the fourth quarter wave plate 270, the fourth quarter wave plate 270 may convert the polarization of the light wave from the RCP to vertical polarization.

The light wave may pass through the fourth quarter wave plate 270 and may then be on the polarizing beam splitter 250. Since the polarizing beam splitter 250 may pass vertically polarized light, the light wave may pass through the polarizing beam splitter 250 and may then be incident on the third quarter wave plate 260. When the light wave passes through the third quarter wave plate 260, the third quarter wave plate 260 may convert the vertical polarization of the light wave into the RCP. The light wave may pass through the third quarter wave plate 260 and may then be incident on the first mirror 261. When the light wave is reflected by the first mirror 261, the first mirror 261 may convert the polarization of the light wave from the RCP to the LCP. The light wave may be reflected by the first mirror 261 and may then be incident on the third quarter wave plate 260. When the light wave passes through the third quarter wave plate 260, the third quarter wave plate 260 may convert the polarization of the light wave from the LCP to horizontal polarization.

The light wave passes through the third quarter wave plate 260 and may then be incident on the polarizing beam splitter 250. Since the polarizing beam splitter 250 may reflect horizontally polarized light, the light wave may be rotated 90 degrees counterclockwise and may then be incident on the second quarter wave plate 240. When the light wave passes through the second quarter wave plate 240, the second quarter wave plate 240 may convert the horizontal polarization of the light wave into the RCP. The light wave may pass through the second quarter wave plate 240 and may then be incident on the half mirror 230. When the light wave is reflected by the half mirror 230, the half mirror 230 may convert the polarization of the light wave from the RCP to the LCP. The light wave may be reflected by the half mirror 230 and may then be incident on the second quarter wave plate 240. When the light wave passes through the second quarter wave plate 240, the second quarter wave plate 240 may convert the polarization of the light wave from the LCP to vertical polarization. The light wave may pass through the second quarter wave plate 240 and may then be incident on the polarizing beam splitter 250. Since the polarizing beam splitter 250 may transmit vertically polarized light, the light wave may pass through the polarizing beam splitter 250 and may then be incident on the reflective polarizer 280. Since the reflective polarizer 280 may transmit vertically polarized light, the light wave with vertical polarization may be output after passing through the reflective polarizer 280.

Referring to FIG. 2B, "e" may denote the distance between the half mirror 230 and the second quarter wave plate 240, "a" may denote the distance between the second quarter wave plate 240 and any point on the polarizing beam splitter 250, "b" may denote the distance between any point on the polarizing beam splitter 250 and the reflective polarizer 280, "c" may denote the distance between any point on the polarizing beam splitter 250 and the fourth quarter wave plate 270, and "d" may denote the distance between any point on the polarizing beam splitter 250 and the third quarter wave plate 260.

A light wave incident on the structure of the optical system 20 may pass through the half mirror 230 and the second quarter wave plate 240, and may then be incident on the polarizing beam splitter 250. After rotating 90 degrees clockwise and passing through the third quarter wave plate 260, the light wave may be reflected by the first mirror 261 and incident on the polarizing beam splitter 250. After passing through the polarizing beam splitter 250 and the fourth quarter wave plate 270, the light wave may be reflected by the second mirror 271 and incident back on the polarizing beam splitter 250. After rotating 90 degrees counterclockwise and being reflected by the reflective polarizer 280, the light wave may be incident on the polarizing beam splitter 250.

After being rotated 90 degrees clockwise by the polarizing beam splitter 250 and passing through the fourth quarter wave plate 270, the light wave may be reflected by the second mirror 271 and incident on the polarizing beam splitter 250. After passing through the polarizing beam splitter 250 and the third quarter wave plate 260, the light wave may be reflected by the first mirror 261 and incident back on the polarizing beam splitter 250. After rotating 90 degrees counterclockwise and passing through the second quarter wave plate 240, the light wave may be reflected by the half mirror 230. Thereafter, the light wave may be output after sequentially passing through the second quarter wave plate 240, the polarizing beam splitter 250, and the reflective polarizer 280.

Accordingly, an optical path may be a path where the light wave is output after traveling the physical distance e+a+b three times and traveling the physical distance c+d four times. In other words, the structure of the optical system 20 may form an optical path that is 4(c+d) longer than the optical path of 3(e+a+b) formed by the structure of the optical system 10 in FIG. 1B. The hologram display system may form a longer optical path by including the structure of the optical system 20. At the same time, the hologram display system may be miniaturized by including the structure of the optical system 20.

Figure 3:
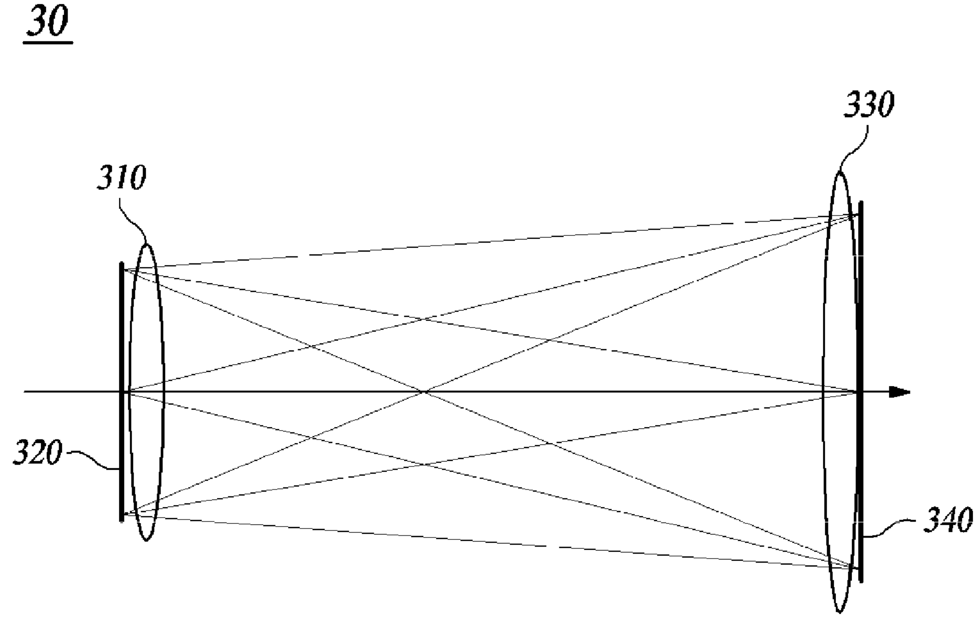
FIG. 3 is a view for illustrating a structure for reconstructing a hologram according to an embodiment of the present disclosure.

FIG. 3 is a view for illustrating a structure for reconstructing a hologram according to an embodiment of the present disclosure.

Referring to FIG. 3, the structure for reconstructing a hologram 30 may include a first lens 310, a spatial light modulator 320, a second lens 330, a Fourier plane 340, etc. The structure for reconstructing a hologram 30 may be a structure in which a hologram is reconstructed based on the Fourier transform.

The first lens 310 and the second lens 330 may have the same focal length. The distance between the first lens 310 and the second lens 330 may be equal to the focal length. The spatial light modulator 320 may be disposed contiguous to the left side of the first lens 310. The spatial light modulator 320 may modulate and radiate input light waves. The spatial light modulator 320 may be a re-imaged spatial light modulator. The Fourier plane 340 may be disposed contiguous to the right side of the second lens 330. The Fourier plane 340 may be a reference plane for outputting a hologram. The size of a reconstructed hologram may be determined based on the distance between the first lens 310 and the second lens 330. The system for reconstructing a hologram according to the present disclosure may be capable of reconstructing a hologram by including the structure for reconstructing a hologram 30.

Figure 4:
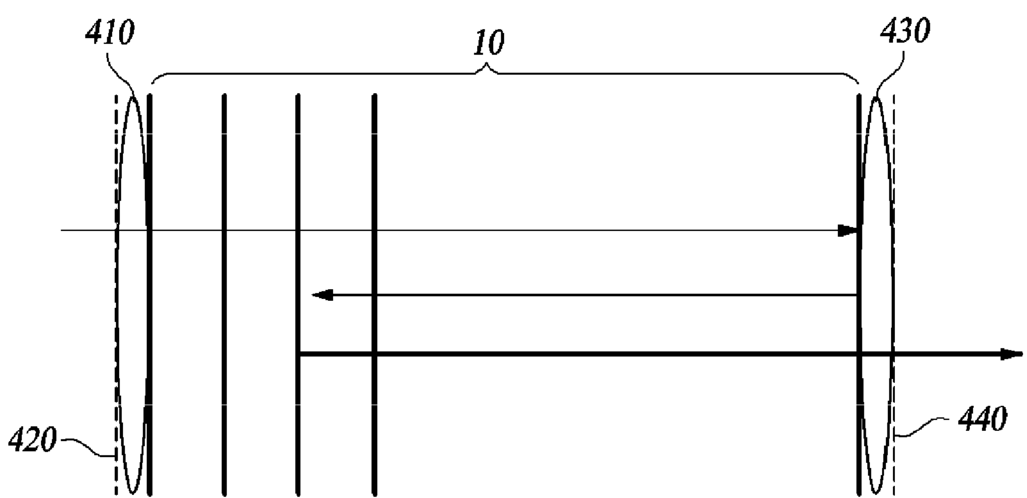
FIG. 4 is a view for illustrating a structure for reconstructing a hologram to which the structure of the optical system has been applied according to an embodiment of the present disclosure.

FIG. 4 is a view for illustrating a structure for reconstructing a hologram to which the structure of the optical system has been applied according to an embodiment of the present disclosure.

Referring to FIG. 4, the structure for reconstructing a hologram 40 may include the structure of the optical system 10, a first lens 410, a spatial light modulator 420, a second lens 430, a Fourier plane 440, etc. The structure for reconstructing a hologram 40 may be a structure in which a hologram is reconstructed based on the Fourier transform.

The spatial light modulator 420 may be disposed contiguous to the left side of the first lens 410. The first lens 410 may be disposed contiguous to the left side of the polarizer 110. The spatial light modulator 420 may modulate and radiate input light waves. The Fourier plane 440 may be disposed contiguous to the right side of the second lens 430. The second lens 430 may be disposed contiguous to the right side of the reflective polarizer 150. The Fourier plane 440 may be a reference plane for outputting a hologram. The system for reconstructing a hologram may be capable of reconstructing a hologram by including the structure for reconstructing a hologram 40.

Figure 5:
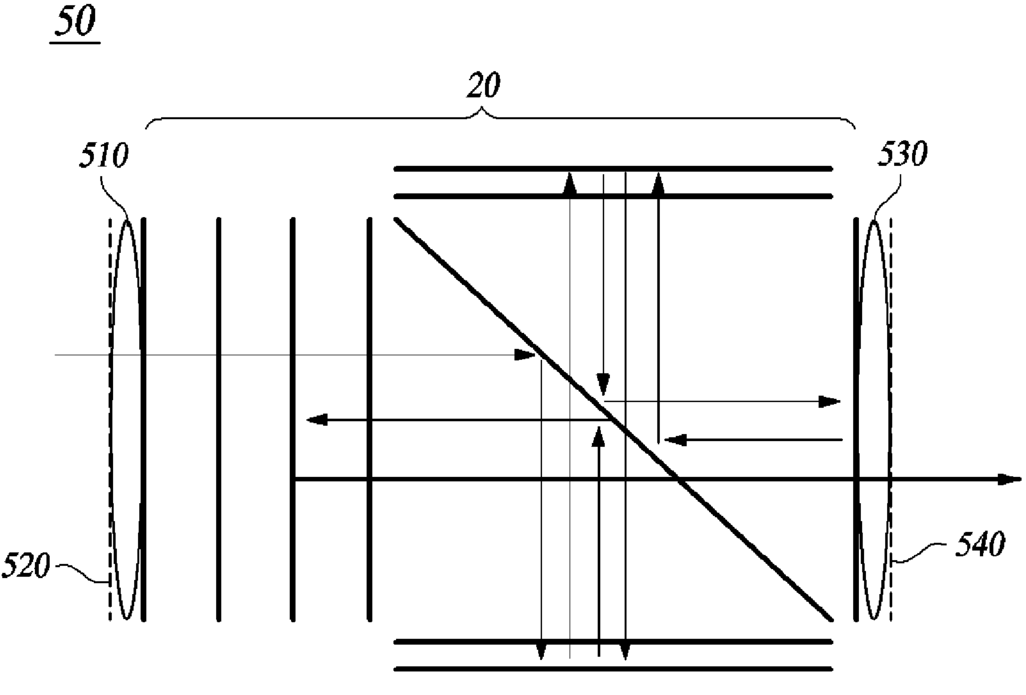
FIG. 5 is a view for illustrating a structure for reconstructing a hologram to which the structure of the optical system has been applied according to another embodiment of the present disclosure.

FIG. 5 is a view for illustrating a structure for reconstructing a hologram to which a structure of an optical system has been applied, according to another embodiment of the present disclosure.

Referring to FIG. 5, the structure for reconstructing a hologram 50 may include the structure of the optical system 20, a first lens 510, a spatial light modulator 520, a second lens 530, a Fourier plane 540, etc. The structure for reconstructing a hologram 50 may be a structure in which a hologram is reconstructed based on the Fourier transform.

The spatial light modulator 520 may be disposed contiguous to the left side of the first lens 510. The first lens 510 may be disposed contiguous to the left side of the polarizer 210. The spatial light modulator 520 may modulate and radiate input light waves. The Fourier plane 540 may be disposed contiguous to the right side of the second lens 530. The second lens 530 may be disposed contiguous to the right side of the reflective polarizer 280. The Fourier plane 540 may be a reference plane for outputting a hologram. The system for reconstructing a hologram may be capable of reconstructing a hologram by including the structure for reconstructing a hologram 50.

As an optical path becomes longer, the size of a hologram reconstructed by the system for reconstructing a hologram may increase. Accordingly, since the structure for reconstructing a hologram 50 may form a long optical path, the system for reconstructing a hologram including the structure for reconstructing a hologram 50 may reconstruct a larger hologram. At the same time, the system for reconstructing a hologram may be miniaturized by including the structure for reconstructing a hologram 50.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An optical system comprising:

a polarizing beam splitter for reflecting a light wave when the light wave is horizontally polarized or transmitting a light wave when the light wave is vertically polarized;

a second quarter wave plate, a half mirror, and a first quarter wave plate, sequentially arranged in a first direction from the polarizing beam splitter, which is a direction opposite to a direction in which the light wave is input;

a third quarter wave plate and a first mirror, sequentially arranged in a second direction from the polarizing beam splitter, which is a direction in which the first direction is rotated 90 degrees counterclockwise;

a fourth quarter wave plate and a second mirror, sequentially arranged in a third direction from the polarizing beam splitter, which is a direction opposite to the second direction; and a reflective polarizer arranged in a fourth direction from the polarizing beam splitter, which is a direction opposite to the first direction, wherein the reflective polarizer reflects the light wave such that the light wave re-enters and is incident on the polarizing beam splitter when the light wave is horizontally polarized and transmits the light wave when the light wave is vertically polarized, wherein the polarizing beam splitter is arranged to reflect the light wave re-entered by the reflective polarizer in the third direction, such that the light wave propagates sequentially in the second direction, the first direction, and the fourth direction to form an optical path.

2. The optical system of claim 1, further comprising a polarizer for receiving the light wave and selectively passing horizontally polarized light of the light wave, wherein the polarizer is arranged next to the first quarter wave plate in the first direction from the polarizing beam splitter.

3. The optical system of claim 1, wherein the first quarter wave plate converts horizontal polarization of the light wave into Right-handed Circular Polarization (RCP).

4. The optical system of claim 1, wherein the half mirror transmits or reflects the light wave.

5. The optical system of claim 1, wherein the second quarter wave plate converts a polarization of the light wave from RCP to horizontal polarization, converts horizontal polarization of the light wave into RCP, or converts the polarization of the light wave from Left-handed Circular Polarization (LCP) to vertical polarization.

6. The optical system of claim 1, wherein the third quarter wave plate converts horizontal polarization of the light wave into RCP, converts a polarization of the light wave from LCP to vertical polarization, converts vertical polarization of the light wave into RCP, or converts the polarization of the light wave from LCP to horizontal polarization.

7. The optical system of claim 1, wherein the fourth quarter wave plate converts vertical polarization of the light wave into RCP, converts a polarization of the light wave from LCP to horizontal polarization, converts horizontal polarization of the light wave into LCP, or converts the polarization of the light wave from RCP to vertical polarization.

8. The optical system of claim 1, wherein the first mirror reflects the light wave, and converts a polarization of the light wave from RCP to LCP.

9. The optical system of claim 1, wherein the second mirror reflects the light wave, and converts a polarization of the light wave from RCP to LCP or from LCP to RCP.

10. The optical system of claim 1, wherein, based on a polarization of an input light wave, the polarizing beam splitter, the second quarter wave plate, the half mirror, the first quarter wave plate, the third quarter wave plate, the first mirror, the fourth quarter wave plate, the second mirror, and the reflective polarizer are rotated by a predetermined angle.

11. A method by an optical system, comprising:

receiving a light wave and selectively passing horizontally polarized light of the light wave using a polarizer;

converting horizontal polarization of the light wave into RCP using a first quarter wave plate;

passing the light wave using a half mirror;

converting a polarization of the light wave from RCP to horizontal polarization using a second quarter wave plate;

reflecting the light wave using a polarizing beam splitter and making it incident on a third quarter wave plate;

converting horizontal polarization of the light wave into RCP using the third quarter wave plate;

reflecting the light wave using a first mirror and converting the polarization of the light wave from RCP to LCP;

converting the polarization of the light wave from LCP to vertical polarization using the third quarter wave plate;

passing the light wave through the polarizing beam splitter and making it incident on a fourth quarter wave plate;

converting vertical polarization of the light wave into RCP using the fourth quarter wave plate;

reflecting the light wave using a second mirror and converting the polarization of the light wave from RCP to LCP;

converting the polarization of the light wave from LCP to horizontal polarization using the fourth quarter wave plate;

reflecting the light wave using the polarizing beam splitter and making it incident on a reflective polarizer;

reflecting the light wave using the reflective polarizer and making it incident on the polarizing beam splitter;

reflecting the light wave using the polarizing beam splitter and making it incident on the fourth quarter wave plate;

converting horizontal polarization of the light wave into LCP using the fourth quarter wave plate;

reflecting the light wave using the second mirror and converting the polarization of the light wave from LCP to RCP;

converting the polarization of the light wave from RCP to vertical polarization using the fourth quarter wave plate;

passing the light wave using the polarizing beam splitter and making it incident on the third quarter wave plate;

converting vertical polarization of the light wave into RCP using the third quarter wave plate;

reflecting the light wave using the first mirror and converting the polarization of the light wave from RCP to LCP;

converting the polarization of the light wave from LCP to horizontal polarization using the third quarter wave plate;

reflecting the light wave using the polarizing beam splitter and making it incident on the second quarter wave plate;

converting horizontal polarization of the light wave into RCP using the second quarter wave plate;

reflecting the light wave using the half mirror and converting the polarization of the light wave from RCP to LCP;

converting the polarization of the light wave from LCP to vertical polarization using the second quarter wave plate;

passing the light wave through the polarizing beam splitter and making it incident on the reflective polarizer; and outputting the light wave by passing the light wave through the reflective polarizer.

12. A system for reconstructing a hologram, comprising:

a polarizing beam splitter for reflecting a light wave when the light wave is horizontally polarized or transmitting a light wave when the light wave is vertically polarized;

a second quarter wave plate, a half mirror, a first quarter wave plate, a polarizer, a first lens, and a spatial light modulator, sequentially arranged in a first direction from the polarizing beam splitter, which is a direction opposite to a direction in which the light wave is input;

a third quarter wave plate and a first mirror, sequentially arranged in a second direction from the polarizing beam splitter, which is a direction in which the first direction is rotated 90 degrees counterclockwise;

a fourth quarter wave plate and a second mirror, sequentially arranged in a third direction from the polarizing beam splitter, which is a direction opposite to the second direction; and a reflective polarizer, a second lens, and a Fourier plane, sequentially arranged in a fourth direction from the polarizing beam splitter, which is a direction opposite to the first direction, wherein the reflective polarizer reflects the light wave such that the light wave re-enters and is incident on the polarizing beam splitter when the light wave is horizontally polarized and transmits the light wave when the light wave is vertically polarized, wherein the polarizing beam splitter is arranged to reflect the light wave re-entered by the reflective polarizer in the third direction, such that the light wave propagates sequentially in the second direction, the first direction, and the fourth direction to form an optical path.

* * * * *